US 6,629,413 B1

(12) United States Patent
Wendt et al.

(10) Patent No.: US 6,629,413 B1
(45) Date of Patent: Oct. 7, 2003

(54) THERMODYNAMIC APPARATUS (75) Inventors: Michael Noel Wendt, Edens Landing (AU); Patrick Joseph Glynn, Kuraby (AU)

(73) Assignee: The Commonwealth of Australia Commonwealth Scientific and Industrial Research Organization, Campbell (AU)

( * ) Notice: Subject to any disclaimer, the term of this patent is extended or adjusted under 35 U.S.C. 154(b) by 0 days.

(21) Appl. No.: 10/019,457

(22) PCT Filed: Apr. 28, 2000

(86) PCT No.: PCT/AU00/00390

§ 371 (c)(1),
(2), (4) Date: May 14, 2002

(87) PCT Pub. No.: WO00/65213

PCT Pub. Date: Nov. 2, 2000

(30) Foreign Application Priority Data

Apr. 28, 1999 (AU) .............................................. PQ 0016
Jan. 17, 2000 (AU) .............................................. PQ 5134

(51) Int. Cl.$^7$ ............................ F02C 1/04; F02C 1/06; F02C 1/10; F02C 7/10; F01K 23/04
(52) U.S. Cl. ........................... 60/655; 60/659; 60/670; 60/682; 60/684
(58) Field of Search ..................... 60/670, 682, 684, 60/655, 659, 266, 267

(56) References Cited

U.S. PATENT DOCUMENTS

| | | | | |
|---|---|---|---|---|
| 2,621,481 A | * | 12/1952 | Bowden ........................ | 60/682 |
| 4,119,556 A | | 10/1978 | Chubb .......................... | 252/70 |
| 4,204,401 A | | 5/1980 | Earnest ........................ | 60/39.03 |
| 4,528,012 A | | 7/1985 | Sturgill ........................ | 65/135 |
| 4,907,410 A | * | 3/1990 | Chang ........................... | 60/655 |
| 5,142,869 A | | 9/1992 | Iizuka et al. .................. | 60/684 |
| 5,570,579 A | * | 11/1996 | Larjola ......................... | 60/651 |
| 5,794,431 A | | 8/1998 | Utamura et al. .............. | 60/39.03 |

FOREIGN PATENT DOCUMENTS

| | | |
|---|---|---|
| DE | 32 31 329 | 2/1984 |
| JP | 09-144560 | 6/1997 |
| JP | 09-144561 | 9/1997 |

* cited by examiner

Primary Examiner—Sheldon J. Richter
(74) Attorney, Agent, or Firm—Ladas & Parry (57) ABSTRACT

A closed cycle thermodynamic apparatus (10) is provided for powering a combustion machine. The apparatus (10) has a compressor (12) for compressing a working medium from a reservoir (14) at temperature T1. The temperature of the working medium increases during compression and reaches temperature T2 when leaving the compressor (12). It is then expanded in an expander (16) for turning the machine. In this manner mechanical work is extracted from the working medium. The apparatus (10) has a first heat exchanger (18) and a second heat exchanger (20) connected to the compressor (12) and the expander (16) in a closed cycle. It also has a burner (22) and a third heat exchanger (24). Air, as a Heat transfer medium, at ambient temperature T5 is induced into the second exchanger (20) to cool the working medium by receiving heat therefrom. The temperature of the working medium decreases from T4 to T1 before entering the compressor (12) for repeating the cycle. The air which is now at a higher temperature T6 is conveyed to the burner (22) where it is mixed with fuel to form a combustion gas reaching an even higher temperature at T7 and passed into the first exchanger (18) for heating the working medium at constant pressure. In this manner the temperature of working medium increases to T3 when entering the expander (16) and following expansion for conversion to mechanical power its temperature reduces to T4. The apparatus (10) thereby recovers heat at all the heat exchangers (18),(20) and (24). This reduces the amount of fuel required to heat the air for combustion.

43 Claims, 9 Drawing Sheets

THERMODYNAMIC APPARATUS

FIELD OF INVENTION

THIS INVENTION relates to a thermodynamic apparatus having a compressor, an expander and heat exchange means connected to the compressor and the expander, and a compressible working medium arranged to flow in the closed cycle. In particular but not limited the apparatus is a closed cycle and/or an indirect fired apparatus and

BACKGROUND OF THE INVENTION

Closed cycle thermodynamic apparatuses such as engines, heat pumps, coolers and the like have been known for some time. These apparatuses have a number of desirable attributes such as:

- no oxidation or carbonation occurs inside apparatus;
- unsuitable fuel sources such as coal or nuclear power can be used;
- inert gas, such as helium can be used as a working medium inside apparatus;
- gases with a higher specific heat can be used within apparatus to increase performance;
- pressures up to 20 atmospheres can be used to reduce apparatus size;
- no inlet filtration is required and no turbine blade erosion occurs when the expander is a turbine;
- a flat specific fuel consumption when operating below full power can be obtained as compressor entry pressure can be modulated for preserving cycle pressure ratio and stator outlet temperature.

However, operating efficiency of these prior art closed cycle apparatuses is limited to about that of open cycle gas engines, even when equipped with a recuperator for recovering some heat from the exhaust gas.

In view of the requirement of heat exchangers in the closed cycle apparatuses and the added expenses and maintenance work associated therewith, at the present time open cycle engines are usually preferred.

Other thermodynamic apparatuses known to the applicant include an expander having a combustion chamber designed for a specific fuel. Usually the fuel is of a high grade kind. The known apparatuses therefore cannot be used with an alternate fuel or energy source.

Consequently there is abundance of low grade resources such as low grade coal, biomass, municipal waste and the like, which are unused and considered waste materials.

These waste materials are normally left in the open and generally looked upon as environmental scars.

OBJECT OF THE INVENTION

An object of the present invention is to provide a closed cycle thermodynamic apparatus which will at least reduce one or more of the above disadvantages.

A further object of the present invention is to provide an indirect fired thermodynamic apparatus which may be adapted to use low grade fuel resources.

SUMMARY OF THE INVENTION

In one aspect therefore the present invention resides in a thermodynamic apparatus comprising a compressor, an expander and heat exchange means connecting the compressor and the expander in a closed cycle, and a compressible working medium arranged to flow in the closed cycle. The apparatus further comprises heat recovery means having a heat transfer medium arranged to recover heat by transferring at least certain amount of the heat to and/or from the working medium.

Preferably the heat recovery means is configured so that the temperature of the working medium is within a first predetermined range of temperatures when entering the compressor and/or within a second predetermined range of temperatures when entering the expander.

The apparatus may have a combustion chamber arranged for preheating the heat transfer medium preceding to transferring heat to the working medium.

It is preferred that the heat exchange means includes a first heat exchanger member and a second heat exchanger member, both of which being connected between the compressor and the expander. The first member is arranged downstream to the compressor, and the second member downstream to the expander. The heat transfer medium is arranged to transfer heat to one of said first and second members and to receive heat from the other of the first and second members.

Desirably the heat transfer medium is arranged to travel in a counter flow relationship with said working medium.

In one form the heat transfer medium is arranged to pass through the second member and to receive heat from the working medium, so that the temperature of the working medium is reduced to within the first range of temperatures. The heat transfer medium is then arranged to be heated in the combustion chamber so that at the second member it can transfer heat to the working medium to increase the temperature of the working medium to within the second range of temperatures.

Typically the combustion chamber includes a burner for heating the chamber and the apparatus has fuel preheating means arranged for preheating fuel for the burner. Suitably the preheating means is in the form of a fuel heat exchange member through which the heat transfer medium and the fuel are arranged to pass and in a heat transfer relationship.

Any one of the heat exchange members may have a first flow path for the working medium and a second flow path for the heat transfer medium. Advantageously the first and second flow paths are conduits arranged in the heat exchanger or exchangers. More advantageously the conduits of the first and second flow paths are arranged parallel to each other and have a common wall.

The apparatus of the present invention therefore has a higher thermal efficiency than the prior art closed cycle apparatuses as it recovers heat energy which is otherwise lost. Theoretically the apparatus according to the present invention can covert up to 100% of heat energy to mechanical power. This represents a jump in efficiency as the prior art heat recovery steam generation turbine has a theoretical maximum efficiency of only 60%.

Further, as the combustion and working medium cycles are separate the fuel in the combustion chamber can be given enough time for a complete combustion. This is not possible with conventional turbines. Fuel sources for the apparatus may range from natural gas, petroleum, nuclear energy sources and coal.

The heat transfer medium may be air, coal mine ventilation gases, water and any other suitable fluid.

In another aspect therefore the present invention resides in a thermodynamic apparatus comprising a compressor arranged for compressing a compressible working fluid, an expander for expanding the working fluid, a heat exchange means interconnecting said compressor and said expander for heating the working fluid, and heating means arranged for heating a heat transfer medium and for supplying the heated medium to the heat exchange means for indirectly heating the working fluid while in said exchange means.

The thermodynamic apparatus of this further aspect of the invention may be of open cycle or closed cycle type. Preferably it is a closed cycle type as hereinbefore described.

Preferably the heating means is a combustor arranged for burning a low grade fuel including low grade coal, biomass or municipal waste, and converting said fuel into the heat transfer medium. Alternatively the heating means may be a solar cell arrangement having a conduit through which the heat transfer medium passes and one or more solar cells for collecting solar energy. The one or more solar cells are arranged to supply heat to the transfer medium.

In one form the combustor is a kiln for burning said fuel for conversion into the heat transfer medium. Typically said kiln is a rotary kiln.

Desirably, said fuel is a low grade coal and the kiln is adapted to convert said coal into flue gas being a form of said heat transfer medium and ash which can be formed as a by-product such as closed or open cell spherical nodules for lightweight building materials. Limestone may be added to convert any sulphur dioxide to calcium sulphate. This should at least reduce the amount of low grade coal which poses environmental problems.

If desired methane gas may also be introduced into the kiln for combustion. This is specially advantageous as very low concentration methane from an underground mine can be put into good use while at the same time removing it from the mine.

The heated transfer medium exiting said heat exchange means may be channelled into the compressor for use as the working fluid or a supplement of the working fluid.

The working fluid from said expander may also be channelled into the combustor to join said heat transfer medium.

Advantageously, the apparatus further comprises heat storage means arranged for storing heat transferred from said heat transfer medium and for controllably releasing heat to be transferred to the working fluid. The heat storage means thereby serves to substantially control temperature of the working fluid and may also be used to even out varying temperatures caused by fuel supplies of varying calorific value and quantity.

Said heat storage means may include a phase changeable material which remains at least partially molten at temperatures expected while the apparatus is operated.

The storage means may have a storage tank containing another heat transfer medium in heat transfer relationship with said phase changeable material.

Typically said phase changeable material is NaCl. The said another heat transfer medium can be a Pb/Sn eutectic alloy.

In one form the heat exchange means includes a first heat exchanger arranged for receiving the heat transfer medium from said heating means, and a second heat exchanger arranged for transferring heat to said working fluid, and the heat storage means is connected to said first and second heat exchangers.

A pump may be provided for circulating said another heat transfer medium around the heat exchange means and the heat storage means.

The apparatus advantageously includes a first preheating means for preheating the fuel before entering the combustor.

The apparatus may also include a second preheating means for preheating air and/or other fuel source before entering the combustor.

A preconditioning means may also be provided for pre-cooling the working fluid before entering the compressor.

It is preferred that at least one of said first and second preheating means comprises a heat exchanger which is arranged so that said heat transfer medium, or working fluid is in a heat transfer relationship with said fuel, or air and/or other fuel source.

Said preconditioning means may also comprise a heat exchange arranged so that said working fluid is in a heat exchange relationship with said heat transfer medium.

A pressure control device may be provided for controlling pressure of said working fluid.

BRIEF DESCRIPTION OF THE DRAWINGS

In order that the present invention be more readily understood and be put into practical effect, reference will now be made to the accompanying drawings wherein.

Figure 1:
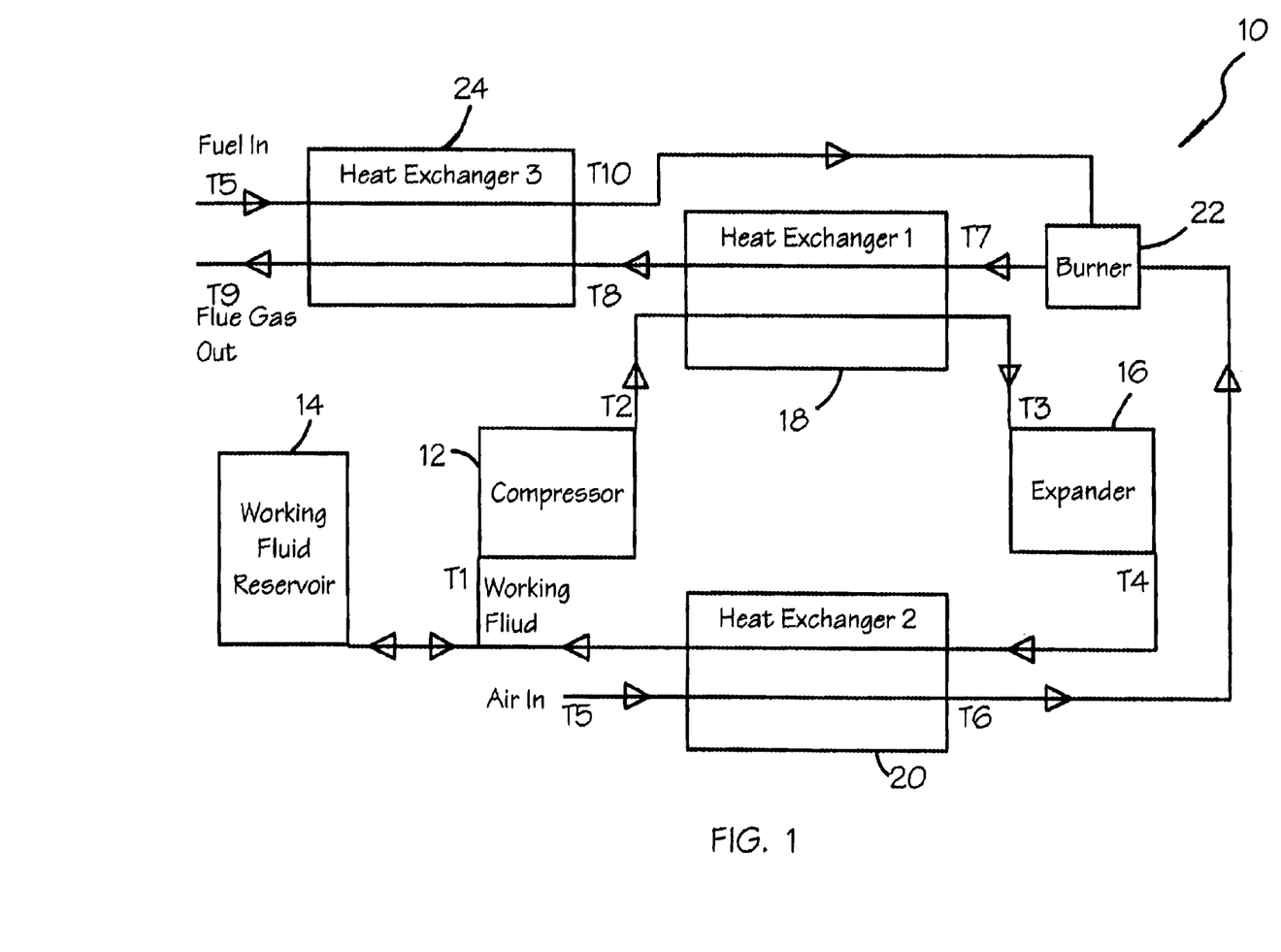
FIG. 1 is a block diagram of the closed cycle thermodynamic apparatus of the present invention adapted for a turbine.

Referring initially to FIG. 1 there is shown a block diagram of the closed cycle thermodynamic apparatus 10 according to the present invention. In this embodiment the apparatus 10 is for powering a turbo engine.

The apparatus 10 has a compressor 12 for compressing a working medium which in this case is nitrogen, initially at temperature T1=50° C. and supplied from a reservoir 14. The temperature of the nitrogen increases during compression. When leaving the compressor 12 the compressed nitrogen is at the temperature T2 which is about 280° C. It is then expanded in an expander 16 for turning the shaft (not shown) of the turbo engine. In this manner mechanical work is extracted from the nitrogen.

The apparatus 10 has a first heat exchanger 18 and a second heat exchanger connected to the compressor 12 and the expander 16 in a closed cycle. That is, the working medium within the apparatus 10 is completely enclosed within the apparatus 10. It also has a burner 22 and a third heat exchanger 24 which will be described later in the specification.

Air, as a Heat transfer medium, at ambient temperature T5 is induced into the second exchanger 20 to cool the nitrogen by receiving heat therefrom. The temperature of the nitrogen decreases from about T4=470° C. to about temperature T1=50° C. before entering the compressor 12 for repeating the cycle. The air which is now at a higher temperature of about T6=440° C. is conveyed to the burner 22 where it is mixed with fuel which is LPG gas in this case, to form a combustion gas reaching an even higher temperature of about T7=1250° C. and passed into the first exchanger 18 for heating the nitrogen at constant pressure. In this manner the temperature of nitrogen increases to about T3=1200° C. when entering the expander 16 and following expansion for conversion to mechanical power it's temperature reduces to about T4=470° C.

The LPG gas for the burner 22 is initially at ambient temperature T5 and is preheated in the third exchanger 24 by flue gas resulting from the combustion. The flue gas is at about T8=330° C. when entering the third heat exchanger 24 and it preheats or transfers heat to the LPG gas to a temperature of about T10=315° C.

The apparatus 10 thereby recovers heat at all the heat exchangers 18, 20 and 24. This reduces the amount of fuel required to heat the air for combustion.

The heat recovered in heat exchangers 20 and 24 displaces fuel required to heat the air for heat exchanger 18 thus resulting in a high thermal efficiency.

Inefficiencies of compression and expansion manifest themselves as heat and hence these are also recovered by the apparatus 10 according to the present invention.

In total the only heat lost to the system is the difference between the flue gas exhaust temperature and the ambient temperature. Using a standard carnot cycle definition of efficiency, the maximum theoretical efficiency is given by $$\eta = 1 - \frac{T_4 - T_1}{T_3 - T_2}$$

Because of heat recovery, T4 is actually the waste heat rejection temperature, and T1 is the ambient temperature. Therefore, the efficiency is equal to 98%.

Figure 2:
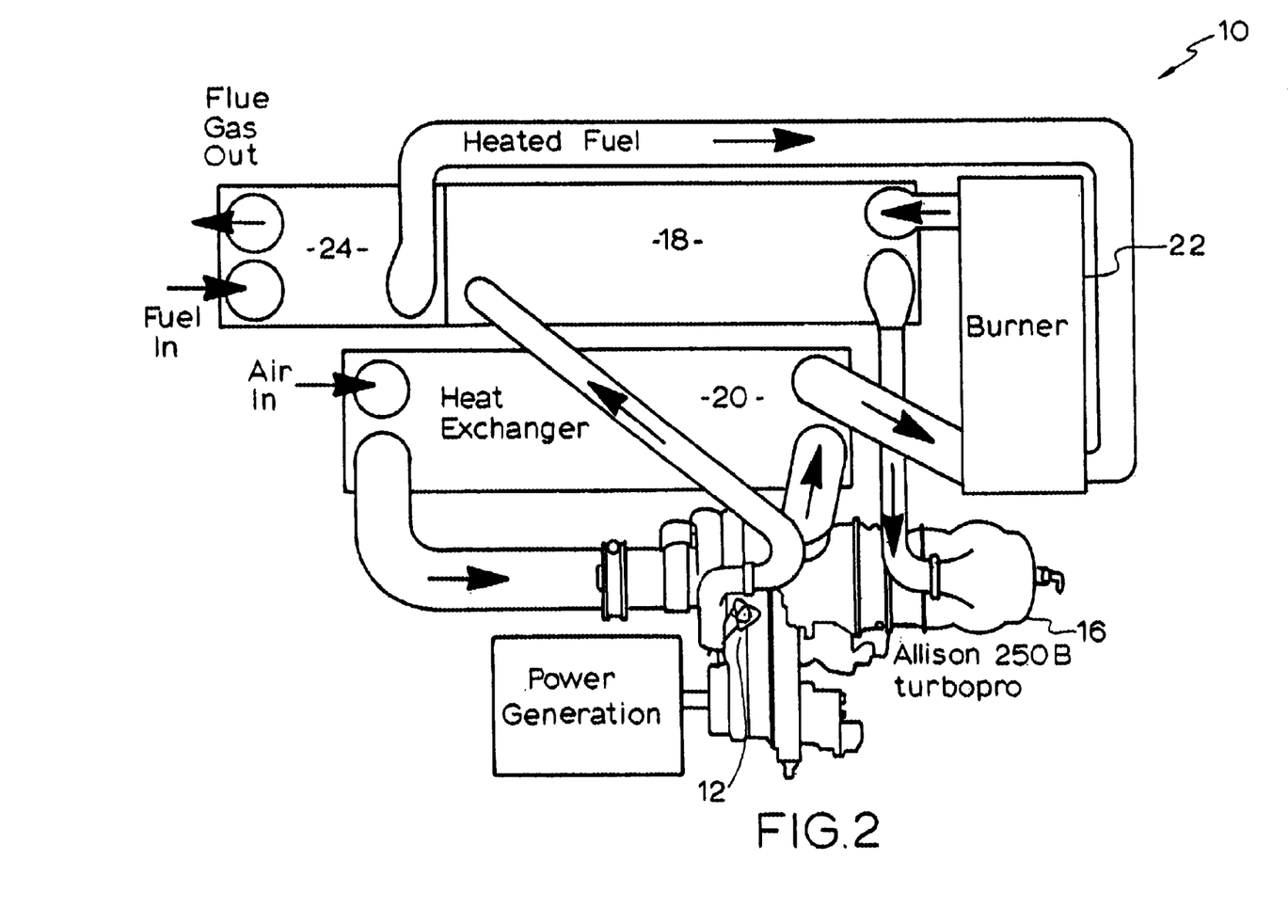
FIG. 2 is a schematic diagram of the apparatus shown in FIG. 1.

In FIG. 2 the apparatus 10 according to the present invention is schematically shown to power an Allison 250B turboprop engine. The nitrogen as the working medium is firstly compressed via an axial and centrifugal compressor 12. Heat is then added to the nitrogen at constant pressure in the first heat exchanger 18. The heated nitrogen expands through a two stage axial turbine 16 to power the shaft and thus extract mechanical power from the nitrogen. The expanded nitrogen returns to the compressor 12 after it is cooled to about its initial temperature in the second heat exchanger 20. Fresh air, at ambient temperature is induced into the second heat exchanger 20 to cool the exhaust gases from the turbine or expander 16. The second heat Exchanger 20 is a welded plate heat exchanger with an efficiency of around 95%. The air flowing through the second heat exchanger 20 is then added to the burner 22 where fuel such as LPG gas is added to raise the temperature to about 1250° C. This hot combustion fuel passes through the third heat exchanger 24 in the form of a plasma welded plate heat exchanger to pass heat to the nitrogen. The combustion gases exit at a temperature of about 330° C. This excess heat is recovered through preheating fuel in the third heat exchanger 24, a conventional plate heat exchanger. The fuel is heated from ambient to approximately 315° C. and takes this heat into the combustion chamber.

The heat recovered in fuel and air pre heating heat exchangers reduces the amount of fuel required to heat the air for the combustor heat exchanger thus resulting in a high thermal efficiency.

If required, insulation is used on all components to minimise heat loss. In total the only heat lost from the apparatus 10 is the difference between the flue gas exhaust temperature and the ambient temperature.

A flat specific fuel consumption at part power can be obtained by adjusting the compressor entry pressure from the working medium reservoir 14 to preserve the cycle pressure ratio and burner outlet temperature.

Figure 3:
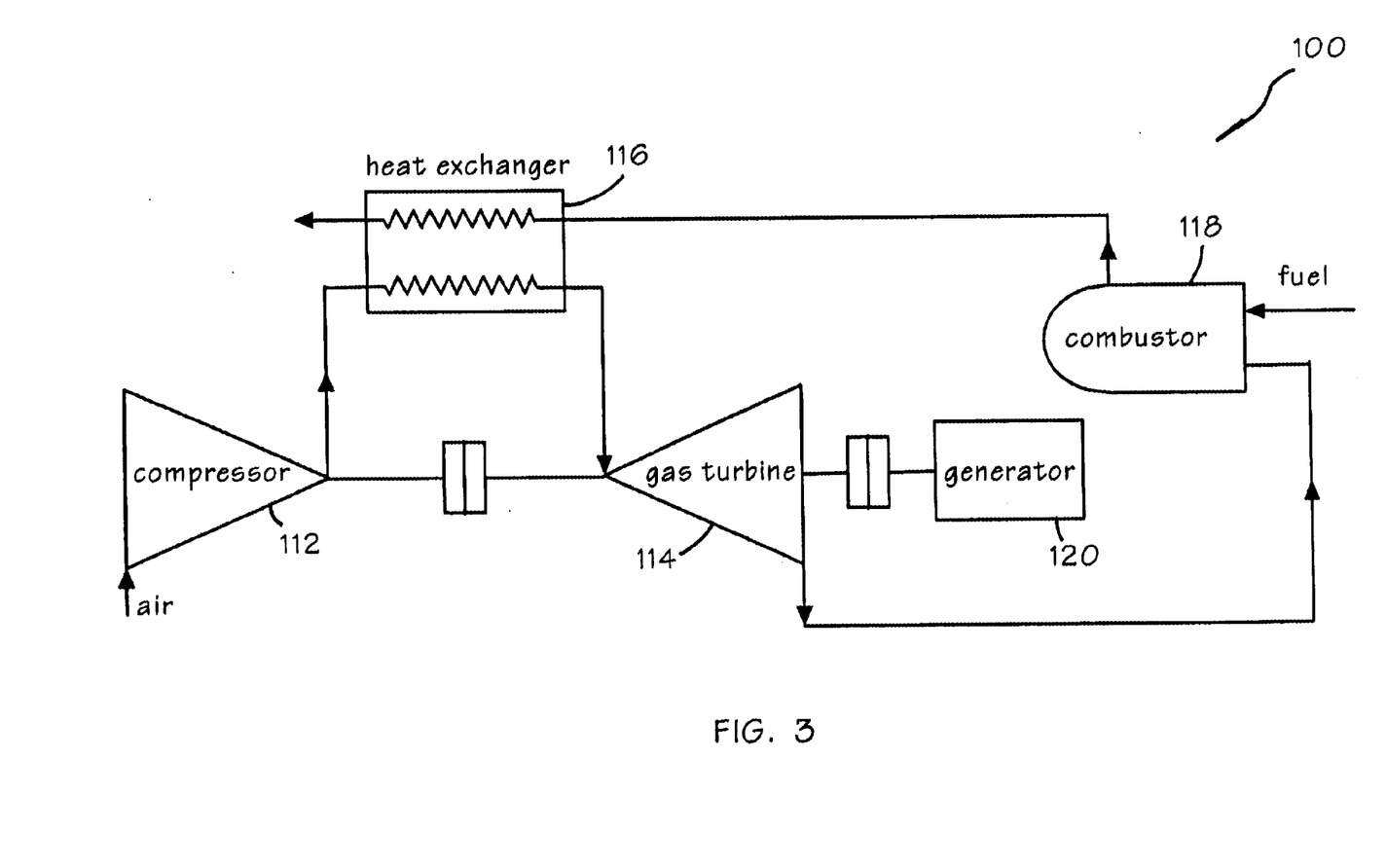
FIG. 3 is a schematic block diagram of one embodiment of the indirect fired thermodynamic apparatus according to the present invention.

Referring now to FIG. 3 there is schematically shown an embodiment of the indirect fired the thermodynamic apparatus 100 according to the present invention. The apparatus 100 comprises a compressor 112 for compressing a working fluid which in this case is air, and passes the compressed air to an expander 114 which is a gas turbine in this case. The gas turbine 114 may be a modified 250 KW Allison 250-C18. The modification involves removal of its combustion chamber assembly and connection of the turbine 114 to a heat exchange means 116.

The heat exchange means 116 is arranged so that the compressed air passes through one of its elements before entering the turbine 114. Its other element is in communication with a heating means or combustor 118 so that combustion products from a fuel source travel through said other elements whereby giving up heat to the working fuel.

The heated working fluid expands in the turbine 114 and releases energy to drive an electricity generator 120 which is coupled to the turbine 114, the released energy is also used to drive the compressor 112.

Figure 4:
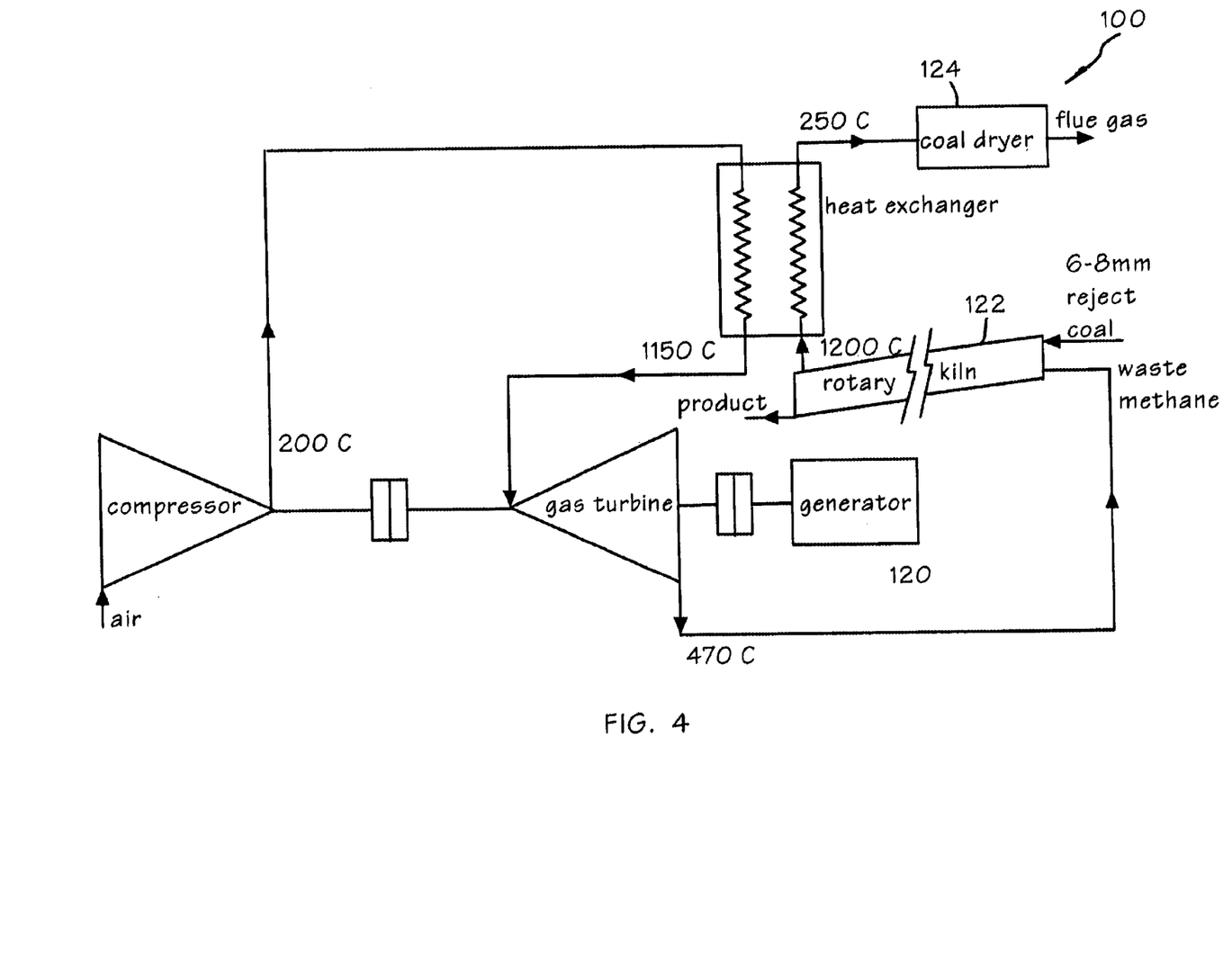
FIG. 4 is a specific form of the apparatus shown in FIG. 3 being adapted to use low grade coal and waste methane as fuel sources.

In FIG. 4, the combustor 118 of the apparatus 100 is in the form of a rotary kiln 122 adapted to receive low grade coal which has been ground to a size about 6–8 mm. The rotary kiln 122 is also designed so that the low grade coal has a relatively long residence time therein and a relatively large surface area of high temperatures, for ensuring combustion of very low concentration mine methane.

A drier 124 is arranged to dry the coal from the rotary kiln 122.

The apparatus 100 shown in FIG. 4 can therefore be utilised to burn reject coal (low grade coal) and waste mine methane.

The ash from the burnt coal can be processed so that it is converted into a useful by-product such as closed or open cell spherical nodules ideal for manufacture of lightweight building materials and gravel substitutes. In this manner, little or no fly ash or slag is produced from combustion of low grade coal with extremely high ash contents.

Limestone can be added to convert any sulphur compound to calcium sulphate.

Figure 5:
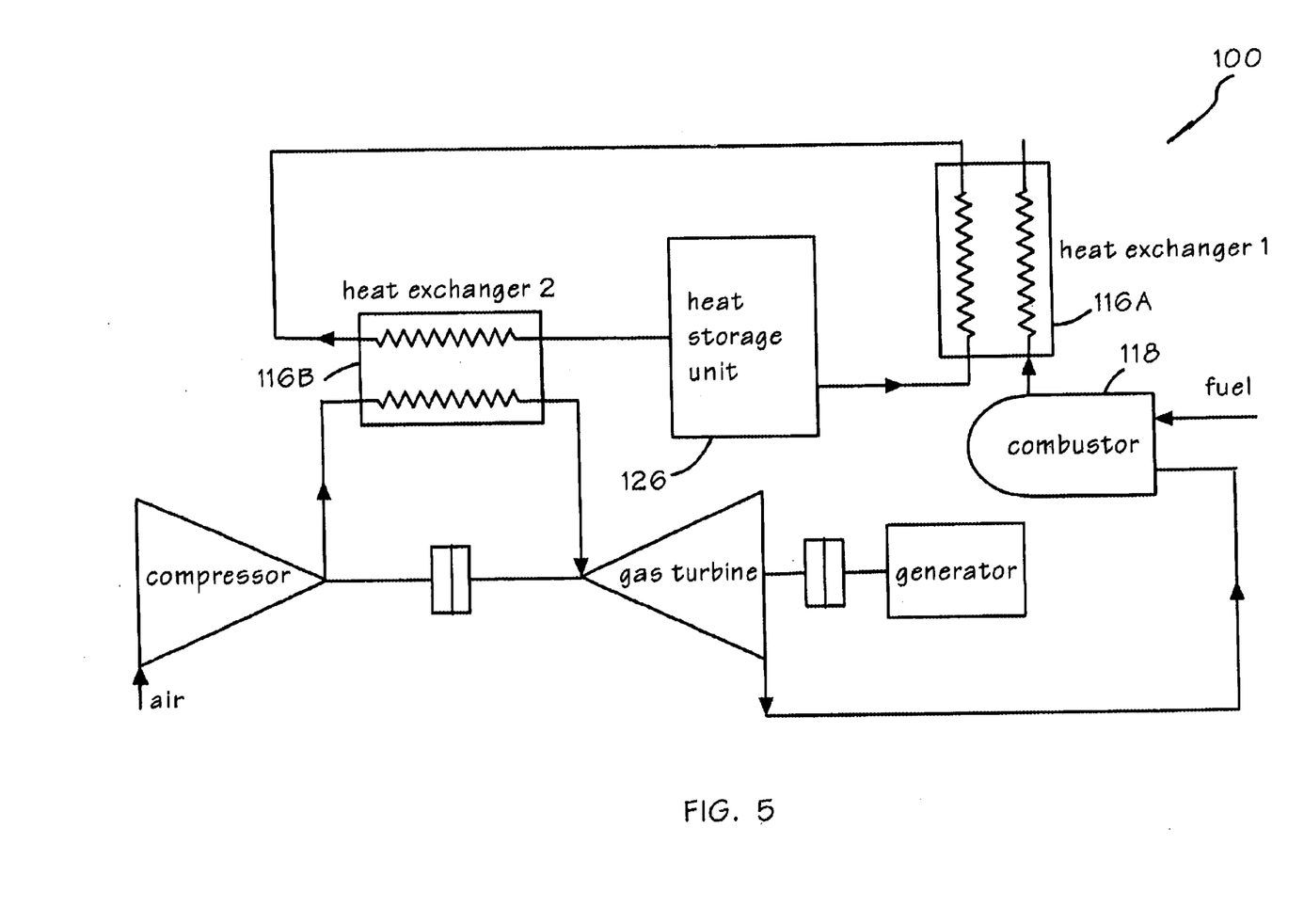
FIG. 5 is a schematic block diagram of another embodiment of the indirect fired thermodynamic apparatus according to the present invention incorporating a heat storage means.

The apparatus 100 shown in FIG. 5 has the heat exchange means 116 in the form of a first heat exchanger 116A and a second heat exchanger 116B connected as shown. A heat storage means 126 is provided with a phase changeable material in a heat exchange relationship with another heat transfer medium which is controllably circulated between the first and second heat exchangers 116A and 116B in order to maintain a substantially consistent temperature in the compressed working fluid. This arrangement evens out fuel supplies of varying calorific value and quantity.

Figure 6:
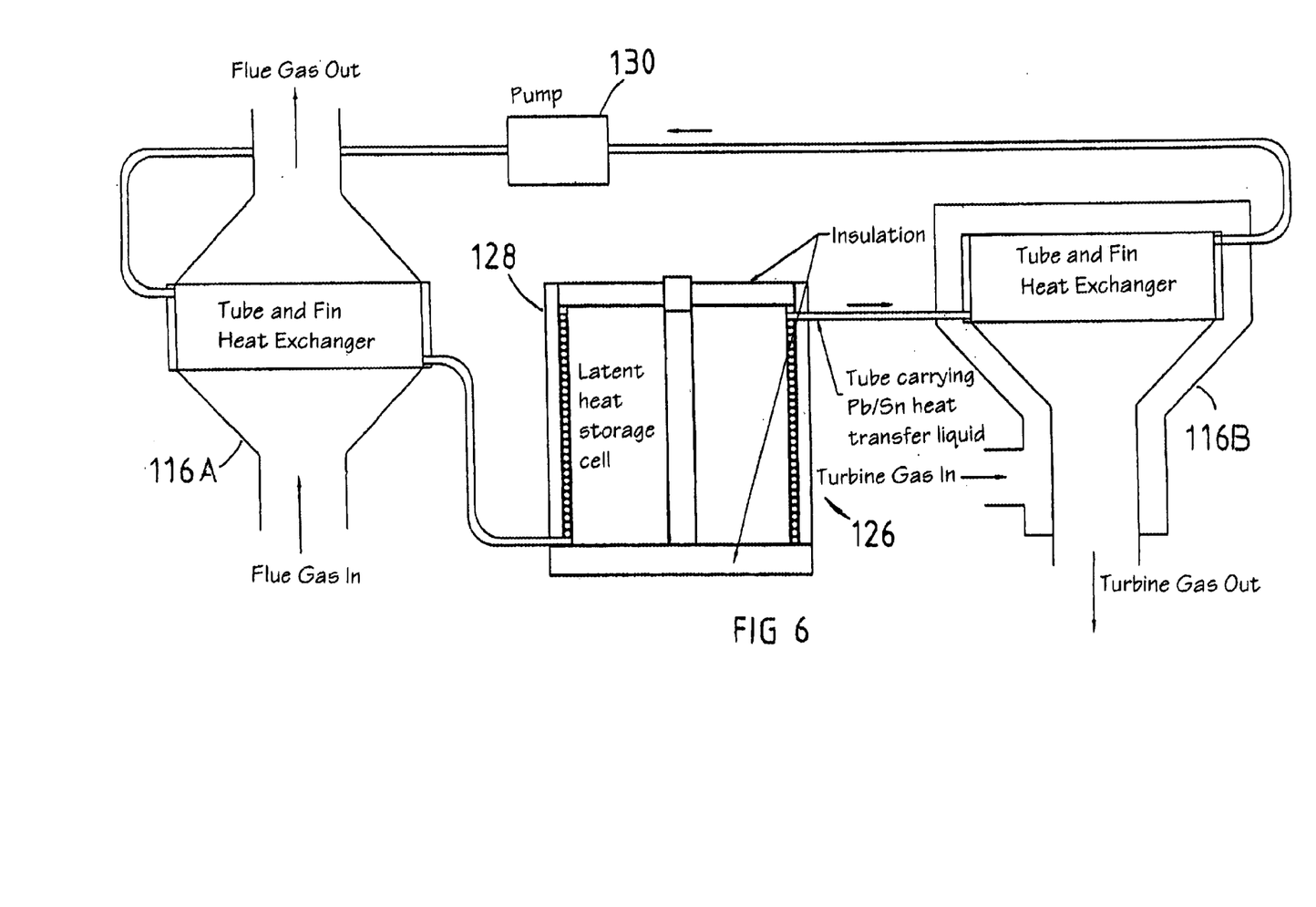
FIG. 6 shows schematically one form of the heat storage means shown in FIGS. 4 and 5.

The heat storage means 126 is shown more clearly in FIG. 6. As shown the heat storage means 126 is in the form of an insulated tank 128 such as a 50 KW NaCl storage tank with a Pb/Sn eutectic alloy flowable therethrough. As can be seen the Pb/Sn alloy is arranged to be heated in the first heat exchanger 116A by the flue gas to a molten stage from the combustor 118 and a pump 130 pumps the molten Pb/Sn alloy into the storage means 126. Within the storage tank 128 the conduit carrying the Pb/Sn alloy is coiled in order to increase the time therein so that more heat can be transferred into the latent heat storage cell (NaCl). The flow rate of the molten Pb/Sn alloy at the second heat exchanger 116B can be control led by varying the speed of the pump 130 thereby control ling heat to be transferred to the working fluid.

Figure 7:
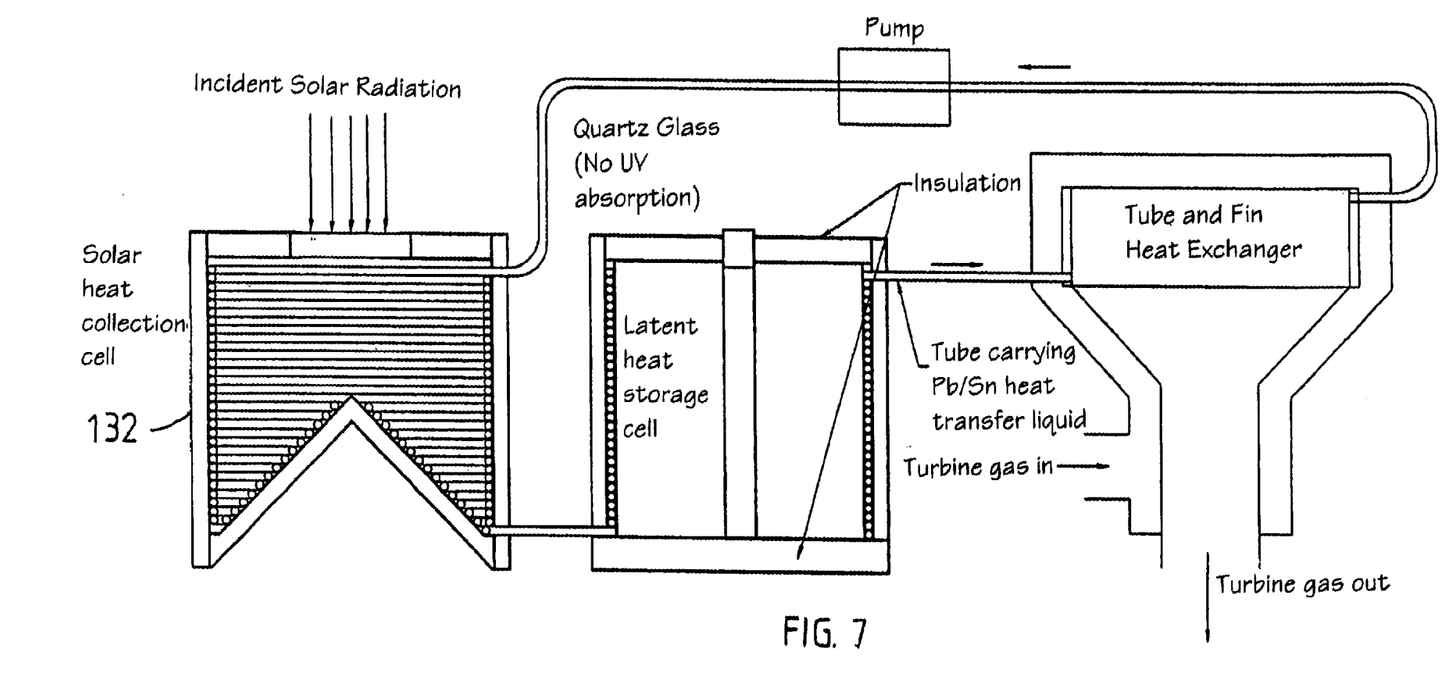
FIG. 7 shows schematically a further embodiment of the indirect fired thermodynamic apparatus according to the present invention with a solar radiation collector being employed as a heating means.

In FIG. 7, the combustor 118 is replaced by a solar heat collection cell 32 with the heat exchanger 116A modified for accommodation the cell 132.

Figure 8:
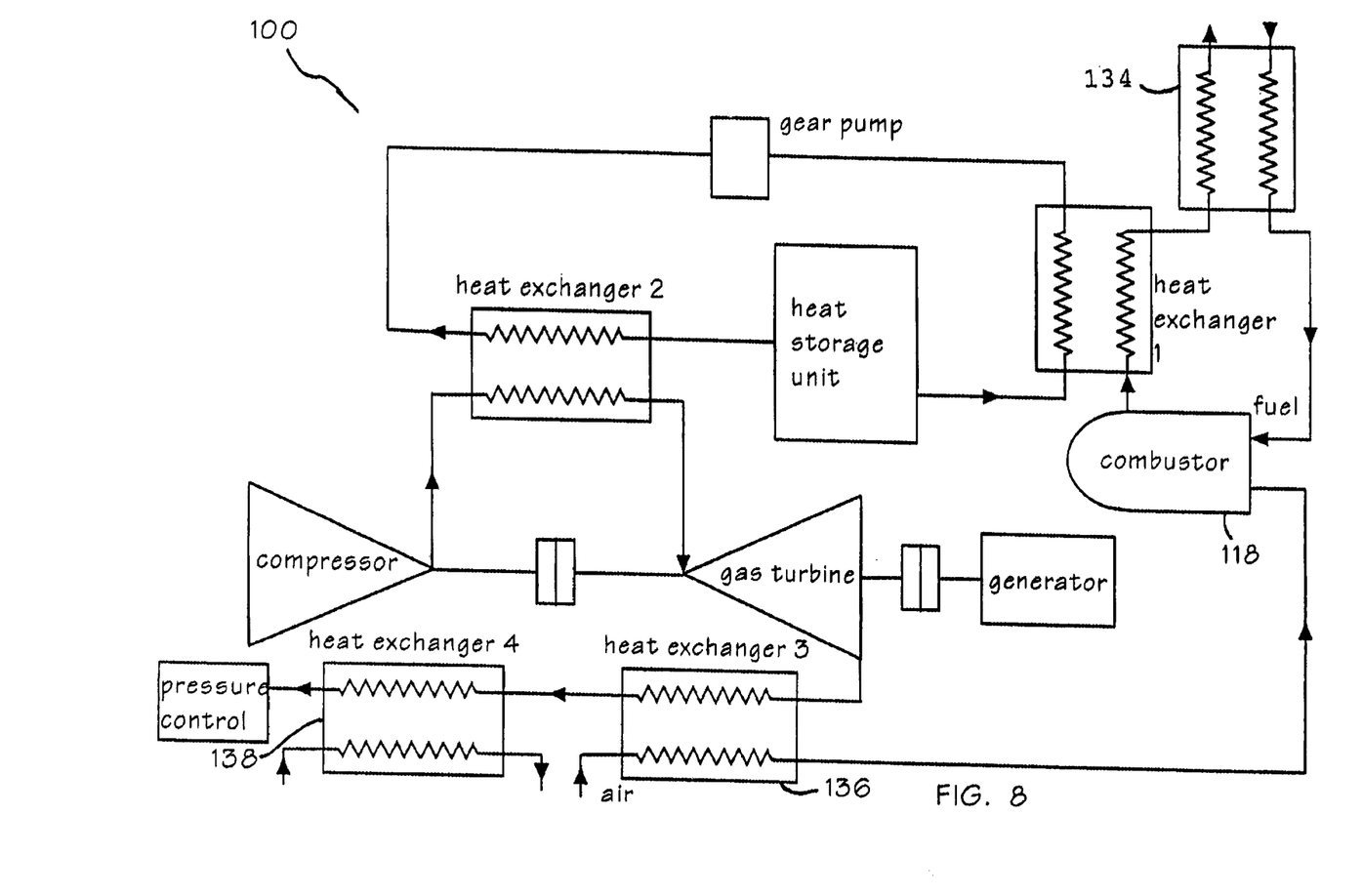
FIG. 8 is a schematic block diagram of the embodiment shown in FIG. 3 provided with a heat recovery arrangement.

In FIG. 8, the apparatus 100 includes a heat recovery arrangement for preheating a fuel source or air with recovered heat. The heat recovery arrangement may include those described with reference to said one aspect of the invention.

As shown, the heat recovery arrangement has a fuel pre-heater 134 arranged for recovering heat from the flue gas and use it so pre-heat the fuel, a third heat exchanger 136 for recovering heat from the working fluid to pre-heat air to the introduced into the combustor 118, and a fourth heat exchanger 138 for precooling the working fluid prior to entering the compressor.

Figure 9:
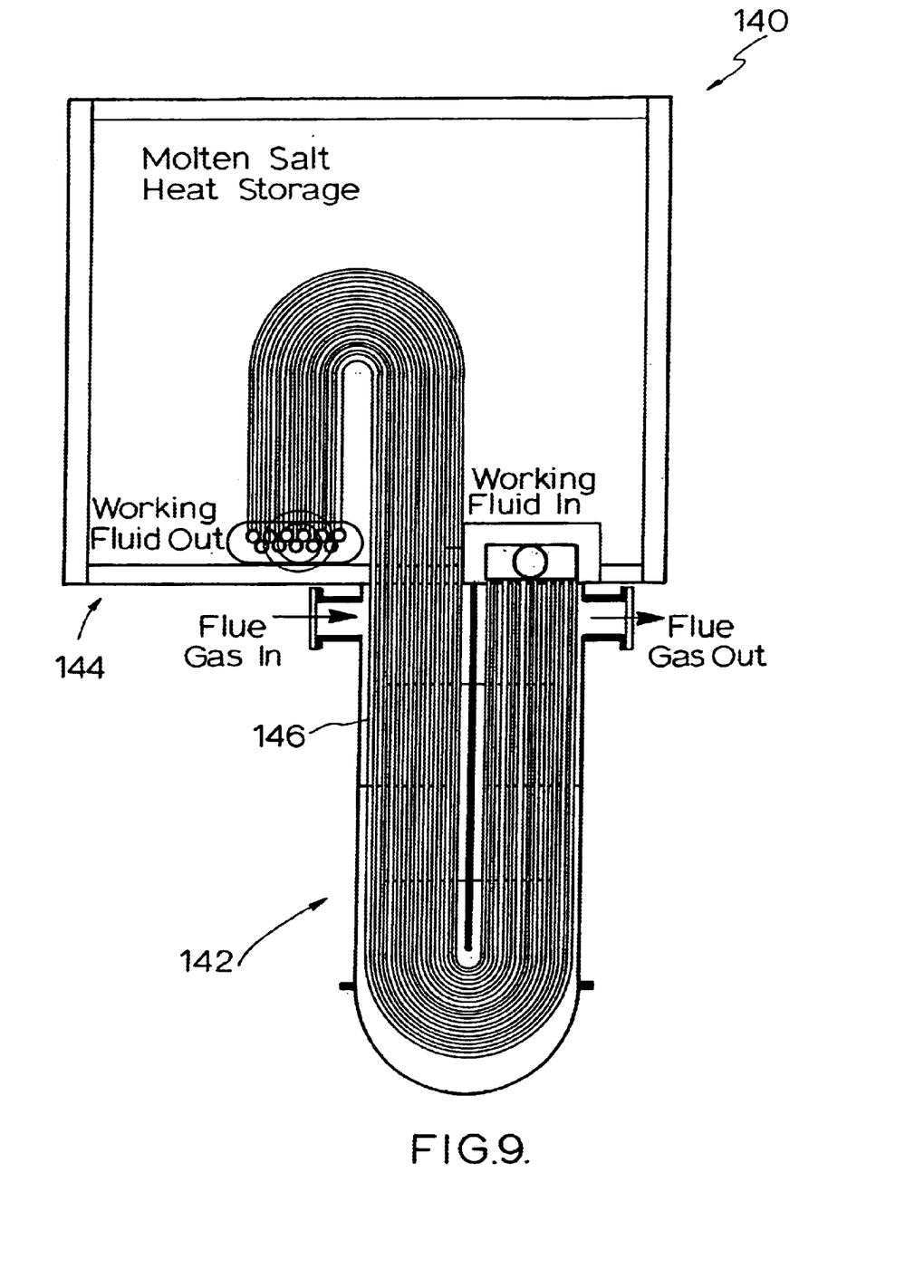
FIG. 9 is another form of the heat transfer storage means shown in FIGS. 5 and 6.

In FIG. 9, an alternative heat exchanger and storage system 140 is shown. The system 140 comprises an integrated heat exchanger 42 and a molten salt storage unit 144 for replacing the heat exchanger 116B and the storage unit 126, 128 shown in FIGS. 5 and 6. In this case the working fluid travels through the salt via heat exchange tubes 146 of the heat exchanger 142. Whilst not specifically shown the salt storage unit may be made separable from the air to air heat exchanger in the modular fashion.

Whilst the above have been given by way of illustrative examples of the present invention many variations and modifications thereto will be apparent to those skilled in the art without departing from the broad ambit and scope of the invention as herein set forth.

What is claimed is:

1. A thermodynamic apparatus comprising a compressor, an expander and heat exchange means connecting the compressor and the expander in a closed cycle, and a compressible working fluid arranged to flow in the closed cycle; the heat exchange means including a first heat exchange member and a second heat exchange member, both of which being connected between the compressor and the expander, the first member being arranged downstream to the compressor, and the second member downstream to the expander; heat recovery means having a heat transfer medium arranged to recover heat by transferring at least certain amount of the heat to and/or from the working fluid, the heat recovery means being configured so that the temperature of the working fluid is within a first predetermined range of temperatures when entering the compressor and/or within a second predetermined range of temperatures when entering the expander; and heat storage means arranged for storing said transferred heat for controllably releasing said stored heat to the working fluid, the heat storage means thereby serving to substantially control temperature of the working fluid and to substantially even out varying temperatures caused by fuel supplies of varying calorific value and quantity, and the heat transfer medium being arranged to transfer heat to said first member and to receive heat from the first member so that the temperature of the working fluid at the second member is reduced to within the first range of temperatures, and the heat transfer medium is arranged to be heated in a combustion chamber so that at the second member it can transfer heat to the working fluid to increase the temperature of the working fluid to within the second range of temperatures.

2. The apparatus according to claim 1 wherein the heat transfer medium is arranged to travel in a counter flow relationship with said working fluid.

3. The apparatus according to claim 1 wherein the combustion chamber is arranged for preheating the heat transfer medium preceding to transferring heat to the working fluid.

4. The apparatus according to claim 3 wherein the combustion chamber including a burner arranged for heating the chamber, and fuel preheating means arranged for preheating fuel for the burner.

5. A thermodynamic apparatus comprising a compressor, an expander and heat exchange means connecting the compressor and the expander in a closed cycle, and a compressible working fluid arranged to flow in the closed cycle, heat recovery means having a heat transfer medium arranged to recover heat by transferring at least certain amount of the heat to and/or from the working fluid, and heat storage means including a phase changeable material which remains at least partially molten at temperatures expected while the apparatus is in operation, the heat storage means being arranged for storing said transferred heat for controllably releasing said stored heat to the working fluid and having a storage tank containing another heat transfer medium in heat transfer relationship with said phase changeable material, the heat storage means thereby serving to substantially control temperature of the working fluid and to substantially even out varying temperatures caused by fuel supplies of varying calorific value and quantity.

6. The apparatus according the claim 5 wherein a pump is provided for circulating said another heat transfer medium around the heat exchange means and the heat storage means.

7. The apparatus according the claim 5 wherein said phase changeable material is NaCl and said another heat transfer medium is a Pb/Sn eutectic alloy.

8. The apparatus according to claim 5 wherein the apparatus further includes heating means arranged for heating the heat transfer medium, and the heat exchange means includes a first heat exchanger arranged for receiving the heat transfer medium from said heating means, and a second heat exchanger arranged for transferring heat to said working fluid, and the heat storage means is connected to said first and second heat exchangers.

9. The apparatus according to claim 5 wherein the heat transfer medium is arranged to travel in a counter flow relationship with said working fluid.

10. The apparatus according to claim 5 wherein fuel sources for the apparatus is selectable from one of natural gas, petroleum, nuclear energy sources and coal and the heat transfer medium is selectable from one of air, coal mine ventilation gases and water.

11. The apparatus according to claim 5 wherein the heat recovery means is configured so that the temperature of the working fluid is within a first predetermined range of temperatures when entering the compressor and/or within a second predetermined range of temperatures when entering the expander.

12. The apparatus according to claim 11 wherein the heat exchange means includes a first heat exchange member and a second heat exchange member, both of which being connected between the compressor and the expander, the first member being arranged downstream to the compressor, and the second member downstream to the expander, and the heat transfer medium being arranged to transfer heat to one of said first and second members and to receive heat from the other of the first and second members.

13. The apparatus according to claim 12 wherein the heat transfer medium is arranged to pass through the first member and to receive heat from the working fluid, so that the temperature of the working fluid at the first member is reduced to within the first range of temperatures, and the heat transfer medium is arranged to be heated in a combustion chamber so that at the second member it can transfer heat to the working fluid to increase the temperature of the working fluid to within the second range of temperatures.

14. The apparatus according to claim 12 wherein one or each of the heat exchange members having a first flow path for the working fluid and a second flow path for the heat transfer medium.

15. The apparatus according to claim 14 wherein the first and second flow paths are conduits arranged in the or each heat exchange member.

16. The apparatus according to claim 15 wherein the conduits of the first and second flow paths are arranged parallel to each other and having a common wall.

17. The apparatus according to claim 5 having a combustion chamber arranged for preheating the heat transfer medium preceding to transferring heat to the working fluid.

18. The apparatus according to claim 17 wherein the combustion chamber including a burner for heating the chamber, and fuel preheating means arranged for preheating fuel for the burner.

19. The apparatus according to claim 18 wherein the preheating means is in the form of a fuel heat exchange member through which the heat transfer medium and the fuel are arranged to pass in a heat transfer relationship.

20. The apparatus according to claim 18 wherein the preheating means is in the form of a fuel heat exchange member through which the heat transfer medium and the fuel are arranged to pass in a heat transfer relationship.

21. A thermodynamic apparatus comprising a compressor arranged for compressing a compressible working fluid, an expander for expanding the working fluid, a heat exchange means interconnecting said compressor and said expander for heating the working fluid, heating means arranged for heating a heat transfer medium and for supplying the heated medium to the heat exchange means for indirectly heating the working fluid while in said exchange means, and heat storage means arranged for storing heat transferred from said heat transfer medium and for controllably releasing heat to be transferred to the working fluid, the heat storage means thereby serving to substantially control temperature of the working fluid and to substantially even out varying temperatures caused by fuel supplies of varying calorific value and quantity.

22. The apparatus according to claim 21 wherein the apparatus is an open cycle or closed cycle type.

23. The apparatus according to claim 21 wherein the heating means including a solar cell arrangement having a conduit through which the heat transfer medium passes and one or more solar cells arranged for collecting solar energy and supplying heat to the transfer medium.

24. The apparatus according to claim 21 wherein the heated transfer medium exiting said heat exchange means is arranged to be channelled into the compressor for use as the working fluid or a supplement of the working fluid.

25. The apparatus according to claim 21 wherein the heat exchange means includes a first heat exchanger arranged for receiving the heat transfer medium from said heating means, and a second heat exchanger arranged for transferring heat to said working fluid, and the heat storage means is connected to said first and second heat exchangers.

26. The apparatus according to claim 21 wherein preconditioning means is provided for precooling the working fluid before entering the compressor.

27. The apparatus according to claim 21 wherein a pressure control device is provided for controlling pressure of said working fluid.

28. The apparatus according to claim 21 wherein said heat storage means including a phase changeable material which remains at least partially molten at temperatures expected while the apparatus is in operation.

29. The apparatus according to claim 28 wherein the storage means having a storage tank containing another heat transfer medium in heat transfer relationship with said phase changeable material.

30. The apparatus according to claim 29 wherein a pump is provided for circulating said another heat transfer medium around the heat exchange means and the heat storage means.

31. The apparatus according to claim 29 wherein said phase changeable material is NaCl and said another heat transfer medium is a Pb/Sn eutectic alloy.

32. The apparatus according to claim 21 wherein the heating means including a combustor arranged for burning a low grade fuel including low grade coal, biomass or municipal waste, and converting said fuel into the heat transfer medium.

33. The apparatus according to claim 32 wherein the working fluid from said expander is arranged to be channelled into the combustor to join said heat transfer medium.

34. The apparatus according to claim 32 wherein the combustor is a kiln for burning said fuel for conversion into the heat transfer medium.

35. The apparatus according to claim 34 wherein said kiln is a rotary kiln.

36. The apparatus according to claim 34 wherein said fuel is a low grade coal and the kiln is adapted to convert said coal into flue gas being a form of said heat transfer medium and ash which can be formed as a by-product.

37. The apparatus according to claim 36 wherein the by-product including closed or open cell spherical nodules for lightweight building materials.

38. The apparatus according to claim 37 wherein limestone is added to convert any sulphur dioxide to calcium sulphate.

39. The apparatus according to claim 38 wherein methane gas is introduced into the kiln for assisting combustion of very low concentration methane from an underground mine.

40. The apparatus according to claim 32 further including a first preheating means for preheating the fuel before entering the combustor.

41. The apparatus according to claim 40 further including a second preheating means for preheating air and/or other fuel source before entering the combustor.

42. The apparatus according to claim 41 wherein at least one of said first and second preheating means comprises a heat exchanger which is arranged so that said heat transfer medium, or working fluid is in a heat transfer relationship with said fuel, or air and/or other fuel source.

43. The apparatus according to claim 40 wherein said preconditioning means comprising a heat exchanger arranged so that said working fluid is in a heat exchange relationship with said heat transfer medium.

* * * * *